(12) United States Patent
Berg et al.

(10) Patent No.: US 10,546,165 B2
(45) Date of Patent: Jan. 28, 2020

(54) RETAIL OBJECT MONITORING WITH CHANGING PULSE RATE OF TRANSMISSION

(71) Applicant: SHOPLABS AS, Oslo (NO)

(72) Inventors: Ole Marius Berg, Oslo (NO); Ole Kristian Rosvold, Eikelandsosen (NO)

(73) Assignee: SHOPLABS AS, Oslo (NO)

( * ) Notice: Subject to any disclaimer, the term of this patent is extended or adjusted under 35 U.S.C. 154(b) by 0 days.

(21) Appl. No.: 16/091,102

(22) PCT Filed: Apr. 11, 2017

(86) PCT No.: PCT/NO2017/050092
§ 371 (c)(1),
(2) Date: Oct. 3, 2018

(87) PCT Pub. No.: WO2017/179994
PCT Pub. Date: Oct. 19, 2017

(65) Prior Publication Data
US 2019/0156082 A1 May 23, 2019

(30) Foreign Application Priority Data
Apr. 12, 2016 (NO) .................................... 20160596

(51) Int. Cl.
*G06K 7/10* (2006.01)
*G06K 19/07* (2006.01)
*G08B 13/24* (2006.01)

(52) U.S. Cl.
CPC ..... *G06K 7/10366* (2013.01); *G06K 19/0723* (2013.01); *G08B 13/2462* (2013.01)

(58) Field of Classification Search
CPC .................................................. G06K 7/10366
USPC .......................................................... 235/385
See application file for complete search history.

(56) References Cited

U.S. PATENT DOCUMENTS

| 6,812,824 B1 | 11/2004 | Goldinger et al. |
| 2007/0139199 A1 | 6/2007 | Hanlon |
| 2015/0154427 A1 | 6/2015 | Barnes et al. |
| 2015/0265221 A1* | 9/2015 | Flanagan ............... G16H 40/67 600/484 |
| 2016/0093182 A1 | 3/2016 | Turgeon |

FOREIGN PATENT DOCUMENTS

WO    WO 2009052455 A1    4/2009

* cited by examiner

*Primary Examiner* — Allyson N Trail
(74) *Attorney, Agent, or Firm* — Hershkovitz & Associates, PLLC; Abe Hershkovitz (57) ABSTRACT

An electronic device (200) for monitoring of retail objects comprising at least one processing means (210), at least one communication means (220) for wireless transmission where transmissions are transmitted at a pulse rate, at least one movement detection means (240) for detecting events, wherein the pulse rate of transmission changes between different pulse rates of transmission based on events.

20 Claims, 7 Drawing Sheets

Fig. 12

RETAIL OBJECT MONITORING WITH CHANGING PULSE RATE OF TRANSMISSION

TECHNICAL FIELD

The present invention relates to an electronic device for monitoring of retail objects, particularly consumer products in retail stores.

BACKGROUND

In retail of consumer products there can be some of the following problems theft, misplacement and loss of objects. Each retail object can be outfitted with a radio transmitter that can be used for monitoring each individual object. Individual monitoring of each object can open for the possibility of inventory monitoring, triggering of alerts, and localization of individual objects, as well as for possible mislaid.

It is known how to monitor retail objects using Electronic Article Surveillance (EAS) tags. Typically, an EAS tag is attached to the retail object that should be monitored. In various implementations of EAS systems there can be different types of tags. Examples of tags are active and passive tags. An example of a passive tag is a RFID (Radio-Frequency Identification) tag. Such a tag will return a radio signal when placed in an appropriate RF field, and the RFID tag will then be able to receive and transmit data between over RF. A passive EAS tag will need to receive from an external source the power to transmit, e.g. by electromagnetically induced power. An example of an active EAS tag is a tag that is battery powered and may transmit data over a RF channel.

In prior art anti-theft systems the EAS tags can be active tags. The system includes a central radio device that broadcast a RF signal. As long as an active EAS tag detects the broadcasted signal from the central radio device, this means that everything is in order. In the case of loss of the broadcast signal from the central radio device, the EAS tag will emit an alarm signal.

In a second type of prior art anti-theft systems for retail stores using passive EAS tags, a RFID tag can be attached to a retail object. A store with such a system will have one or more gateway RFID scanners at each customer exit. The RFID tag will be deactivated by the cashier with a RFID deactivator at a purchase. The system will detect when a RFID tags passes through the gateway RFID scanners. If an active RFID tag is detected at the gateway this indicates a retail object exiting the store unpaid.

A common scenario when stealing a retail object is to put the retail object in a sound insulated and RF shielded bag. When the retail object is inserted in to such a bag, the EAS tag alarm will not be audible or will not be detected by a RF scanner at the exit of the store.

In prior art retail object monitoring systems each retail object can be equipped with some type of active or passive tag. In passive tag systems each object or group of objects has to be scanned with a RF scanner to count the number of items. In an active monitoring system each tag can transmit information regarding its presence when needed or requested from a beacon transceiver.

A description from prior art is given in US2014/0210624. It is there proposed a device for monitoring the handling of an object. The device comprises a light sensor, a radio receiver, an analyzing means, a movement sensor and a signaling means where the light sensor trigger activation of the device. The device has the draw back that false alarms is triggered by sudden changes in light conditions like when someone turns the lights on in a store.

Some of the problems with current implementations of retail object monitoring systems are the requirements for bidirectional communication between tags and the system gateway. Having bidirectional RF communication capabilities increase the tag cost and the complexity of the system. The additional RF communication requirements also increase the electrical power needed to operate the tags.

It is a known problem in the field of EAS systems how to handle 1000s of EAS tags within the same system. The problem is to reliably be able to monitor 1000s of EAS tags within the same system and at the same time be alerted in the case of theft.

Thus, the present invention aims at solving at least some of the above mentioned problems. In particular, the present invention has the aim to solve the problem with reliably being able to monitor 1000s of tags within the same system.

SUMMARY OF INVENTION

The object is met by an electronic device for monitoring retail objects and a method for altering the pulse rate of transmissions from an electronic device, according to the characterizing part of the independent claims. Further advantageous features are stated in the independent claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In a first aspect of the present invention relates to an electronic device for monitoring of retail objects. The electronic device comprises at least one processing means, at least one communication means for wireless transmission where transmissions are transmitted at a pulse rate and a motion detection means for detecting events, whereby the pulse rate of transmission changes between different pulse rates of transmission based on events. Events can trigger change between different pulse rates of transmission. The advantage of having different pulse rates would be that likelihood of collision of wireless transmissions from multiple electronic devices will be reduced.

In an advantageous embodiment of an electronic device for the communication means is configured to only transmit. This would be advantageous in that the system is simplified due to no requirement to bi-directionally communicate with the electronic device. One would understand that a cease of transmissions from an electronic device indicates that something has happened to the electronic device. Stop of transmissions from an electronic device may indicate a loss of the electronic device.

In an advantageous embodiment of an electronic device the events that trigger changes of the pulse rate of transmission is detection of movement by the movement detection means. By movement, one would interpret this as any type of movement and also the ceasing of movement. In the context of this application movement should also comprise characteristics of the movement like interval, intensity, duration and also combination of specific movement characteristics. One would understand how to configure the movement detection means to further detect movement in three axis and also duration and intensity to be able to detect among other falling, shaking, and acceleration of the electronic device. The advantage of having movements of the electronic device trigger alteration of the pulse rate can give the possibility to track electronic devices with different refresh rates. A further advantage of having a movement detection means that can discern patterns of movement is that unwanted triggering of movement events can be avoided like someone bumping into storage rack full of electronic devices.

In an advantageous embodiment the events might further comprise change of light intensity, change in temperature or other change in ambient condition. One would know how to construct a system able to monitor the ambient conditions. The advantage of such a possibility would be the ability to trigger events on changes in the ambient conditions e.g. taking the device from indoor to outdoors.

In another embodiment of an electronic device the events further comprise timeout an earlier event. This will have the advantage that pulse rate of transmission can switch to a different pulse rate after a certain time delay e.g. as a failsafe option.

In a particular embodiment of an electronic device the movement detection means can be an accelerometer. The advantage of an accelerometer is that high resolution information of the movement can be detected. One would understand that high resolution information from an accelerometer can be filtered to detect patterns of movement etc. It may further be advantageous to combine an accelerometer with a gyroscope and a magnetometer. Such a combined device would provide further possibilities to monitor a larger amount data and detect patterns of movement. One would understand that an accelerometer comprises sensors like gyroscopes, inclinometers, linear accelerometers, rotation accelerometers and other sensors that detect changes in acceleration of the electronic device.

In another embodiment of an electronic device the movement detection means (240) is means for detecting Doppler shift. One would understand that detection of Doppler shift means detecting frequency deviations in a received radio signal from a stationary transmitter. An advantage with this is that movement of the electronic device can be detected in a compact and reliable way, using a well known technical method, In a particular embodiment of an electronic device the movement detection means can be any device that can detect changes in ambient conditions in the proximity of the electronic device. Ambient conditions that can be monitored can further comprise temperature, pressure, etc.

In an advantageous embodiment of an electronic device the pulse rate of transmission can change between at least a first pulse rate of transmission and at least a second pulse rate of transmission. The second pulse rate of transmission is higher than the first pulse rate of transmission. This makes it possible to avoid collision of wireless transmitted data from multiple electronic devices. The first pulse rate of transmission can be used when low resolution of updates from the electronic devices is needed. The second pulse rate of transmission can be used when there is need to get more frequent updates from the electronic device. The change from the first pulse rate to the second pulse rate or from the second to the first pulse rate is triggered by events. These events can be any type of event like events triggered by the movement detection means, settings in software, timeout of an earlier event etc.

In an embodiment of an electronic device the first pulse rate of transmission could be from hours to days, or days to weeks or weeks to years. It would be advantageous to be able to get a pulse rate of at least once a year to have possibility to have annual inventory control of the items stored and also limit the power consumption. It would further be advantageous to have a pulse rate of once a month to be able to track changes in stored or stocked items on a month to month basis. This would be beneficial when tracking changes of number of stored items on a seasonal basis. It would in other embodiments be advantageous to have a first pulse rate of once a week to be able to perform inventory control once a week. The first pulse rate would be advantageous to select in such a way that the likelihood of collision of transmissions when the electronic device transmitting is reduced. A further advantage with a suitable low first pulse rate will reduce the likelihood simultaneous transmissions from different electronic devices.

It would be further advantageous to select a first pulse rate with a low rate to reduce the power consumption of the electronic device. One would select a suitable first rate of transmission to accommodate the requirements for simultaneously transmitting electronic devices.

In a particular embodiment of an electronic device the second pulse rate of transmission is higher than the pulse rate of a first pulse rate. One would select a suitable pulse rate according to the required need for tracking an electronic device. Further one could select a second pulse rate of transmission that is optimized for long battery life. A further aspect of the second pulse rate is that the pulse rate needs to be sufficient high to track items for preventing theft where the electronic device is inserted into a RF shielded bag. Further, a pulse rate of the second pulse rate needs to be sufficient low to reduce the likelihood of collisions between simultaneously transmitting electronic devices.

In another embodiment an electronic device it can be a tag. The meaning of tag is understood as any electronic device attached to or embedded in an object for the purpose of monitoring said object.

In another embodiment of a tag it can be an EAS tag.

In another embodiment an electronic device, comprises a screen for displaying graphical information wherein the screen in operatively connected to the movement detection means and wherein the screen is activated when events are detected by the movement detection means. The screen can be used for displaying information like price or other graphical data. The graphical content displayed on the screen is controlled by the processing means in the electronic device. The information displayed by the screen can be created by the processing means or received via a wireless communication means. An advantage with a screen is that information can be displayed. Another advantage by having a screen activated when events are detected by the movement detection means is that power consumption by the screen can be reduced.

In a first aspect of a method for altering a pulse rate of transmission of an electronic device when detecting an event the pulse rate changes between at least a first pulse rate and at least a second pulse rate. One would understand that a change from a first pulse rate to a second pulse rate can be discrete or gradual. Where a discrete change is where there is time delay between the last transmission at a first pulse rate and the following transmission at a second pulse rate. A gradual change would mean that the last transmission at a first pulse rate is followed by transmissions with changing time delays until the transmissions are transmitted at a second pulse rate. In a further aspect of an embodiment a change from a second pulse rate to a first pulse rate can be discrete or gradual. Where a discrete change is where there is a delay between the last transmission of a second pulse rate and the following transmission at a first pulse rate. A gradual change would mean that the last transmission at a second pulse rate is followed by transmissions with changing delays until the transmissions are transmitted at a first pulse rate. An advantage with a discrete change between two different pulse rates would be that power consumption will be reduced quickly when changing between higher and lower pulse rates of transmission. Gradual change between a first pulse rate and a second pulse rate or vice versa would provide an advantage in that the transmissions from the electronic device can be tracked also during transition between pulse rates.

In another embodiment of a method for altering the pulse rate of transmission of an electronic device the change from a first pulse rate and to a second pulse rate and vice versa can be a combination of discrete or gradual changes. This could be advantageous to provide possibility to select different changes depending on characteristics of a detected movement of the electronic device.

In a particular embodiment of a method for altering the pulse rate of transmission of an electronic device the events comprise movement of the electronic device. It is advantageous to be able to control the pulse rate of transmissions from the electronic device based on tracking of movement events. It is particularly advantageous to have a different pulse rate while the electronic device is not moving and a second pulse rate when the electronic device is moving.

In one embodiment of a method for altering the pulse rate of transmission of an electronic device the events comprise timeout of an earlier event. It is advantageous to be able alter the pulse rate of transmission at a timeout of an earlier event in case of software errors or longer periods without any movement. One would understand what events should trigger timeouts to create a robust system.

In one embodiment of a method for altering the pulse rate of transmission of an electronic device the second pulse rate of transmission is higher than the first pulse rate of transmission. This is advantageous to limit the power consumption of transmission of the electronic when transmitting. A first pulse rate of transmission is used to preserver power. The second pulse rate is used when in need of higher resolution of monitoring of the electronic device.

In a particular embodiment of a method for altering the pulse rate of transmission of an electronic device there can be a time delay to transition from a first pulse rate to a second pulse rate of transmission. This is advantageous for the device to change pulse rate of transmission when there for instance is a problem or unknown combinations of events.

In a first aspect of a system for monitoring retail objects the system comprises of at least one electronic device, at least one gateway for receiving broadcasts from electronic devices where the transmissions from the electronic devices changes between different pulse rate of transmission. Such a system is advantageous for tracking of retail objects in a store where gathering of stock information can be done automatically or at suitable intervals.

In a first aspect of a method for monitoring retail objects using a system for monitoring of retail objects comprises the steps:
a) recording transmissions from at least one electronic device attached to a retail object by at least one gateway,
b) detecting a change in pulse rate of transmission from at least one electronic device attached to a retail object by at least one gateway,
c) determining the localization of at least one electronic device attached to a retail object based on the received transmissions from an electronic device received by at least one gateway, and
d) generating notifications based on at least one of the detected changes in pulse rate of transmissions transmitted by at least one electronic device attached to a retail object and the determined changes in localization of at least one electronic device.

One would understand that a change in the pulse rate of transmissions from an electronic device can indicate detection of movement by the movement detection means in the electronic device. One would understand that the notifications comprise of alarms, logging to databases, transmitting alerts to store security. An advantage of the described method is to automatically alert the staff of the store when a retail object is lifted up from shelf. One would understand the described method can be used for various purposes. One would understand that the analyzing of the localization of the electronic device can be done over any range of time periods from seconds to minutes, minutes to hours, hours to days or for longer time periods.

In an advantageous embodiment of the method for monitoring retail objects it is used to track the number of times an object has been lifted up and then put back in to the shelf by a customer. This gives information to why a customer inspects an object, but does not complete a purchase of that object. This can indicate mislabeled objects, incorrect pricing or other properties of the object that makes it not desirable after a first inspection.

In another embodiment the method for monitoring retail objects it is used to track localization of objects. The method gives the possibility to track localization of retail objects over time and be notified if the object has been put in an undesirable location. It is advantageous to be able to monitor the localization of perishable products like dairy products. A notification will be generated where the product has been for a longer period of time outside a fridge.

DESCRIPTION OF FIGURES

One possible implementation of the invention will in the following description be disclosed in further details referring to the following figures.

| Overview of components | | |
|---|---|---|
| Number | Component | Short description |
| 100 | | EAS system |
| 200 | | EAS tag |
| 210 | Atmega328pb-aures | Microcontroller |
| 220 | Nrf24011+ | Radio transceiver |
| 230 | Cr2450 | Battery |
| 240 | LIS3DH | Movement Detector |
| 250 | | Sound source |
| 260 | | E-ink screen |
| 300 | | Gateway |
| 310 | Raspberry Pi | Computer |
| 320 | | Barcode scanner |
| 330 | | Screen |
| 400 | | Payment |
| 410 | | Retail object storage system |
| 420 | | Payment system |
| 430 | | Locking mechanism for retail objects |

| Overview of signals | |
|---|---|
| Number | Signal |
| 211 | Alarm ID |
| 221 | Alarm ID (RF signal) |
| 222 | Start Alarm Signal (RF signal) |
| 223 | Update of Price (RF signal) |
| 241 | Accelerometer data |
| 311 | Start Alarm Signal |
| 312 | Update of Price |
| 313 | Control of Lock |
| 314 | Payment system start |
| 321 | Barcode data from barcode scanner |
| 331 | Display data |
| 411 | All retail objects are registered |
| 421 | Data from payment system |
| 431 | Locking mechanics |

DETAILED DESCRIPTION

The invention will now be described by means of the enclosed figures. The different parts of the figures are not necessarily in scale to each other, as the figures are merely for illustrating the invention.

The following description of exemplary embodiments refers to the drawing, and the following detailed description is not meant or intended to limit the invention. Instead, the scope of the invention is defined by the appended claims.

Figure 1:
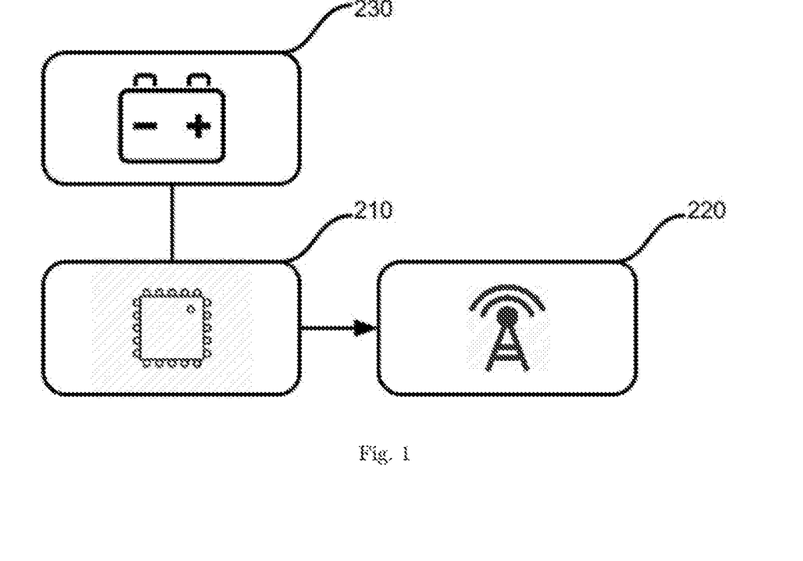
FIG. 1: Shows schematically an overview of a first implementation of an EAS tag.

The following description relates to an EAS tag for monitoring of retail objects. In a first implementation of an EAS tag shown in FIG. 1, an EAS tag comprises a processor 210, a battery 230 and a radio transceiver 220 configured to only transmit data. The processor 210 is in this implementation a microcontroller, e.g. Atmega328pb-aures. The radio transceiver is an nrf24l01+ with a suitable antenna for transmitting data wirelessly to a receiver. The battery 230 is a suitable power source to power the EAS tag, e.g. cr2450. The processor prepares the data and communicates these data over a bus interface to the radio transceiver that in turn converts this into wireless signals. In this first implementation of an EAS tag, the EAS tag is configured to only be able to transmit data in a broadcast fashion.

Figure 2:
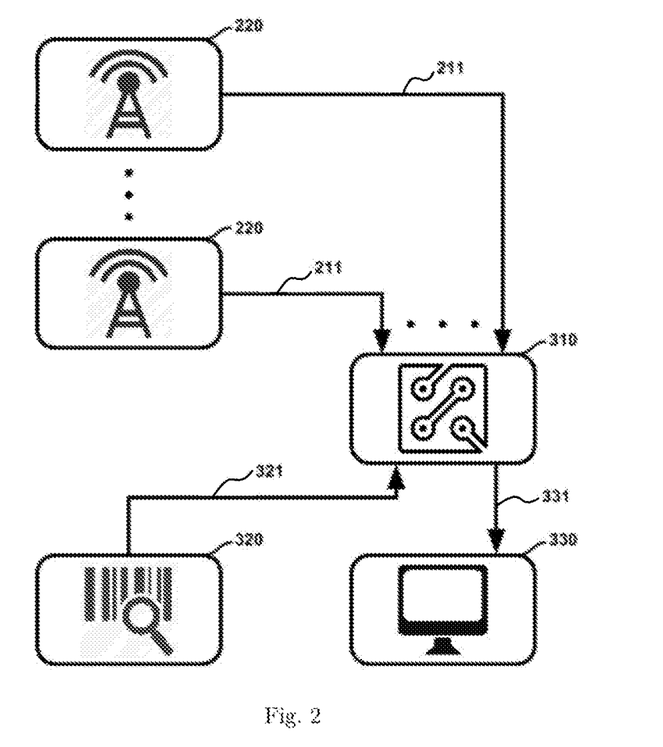
FIG. 2: Shows schematically an overview of a first implementation of a gateway.

In a system using this first implementation of an EAS tag there is a gateway that will monitor and receive the broadcasts from multiple EAS tags. Such a gateway is shown in FIG. 2. The gateway is a computer that communicates with multiple radio transceivers 220. The radio transceivers are adapted to receive the broadcast data from multiple EAS tags. The gateway radio transceivers are placed at different physical locations in a room e.g. a retail store. With a known location of the radio transceivers of the gateway and information concerning the received signal strength of broadcasts from an EAS tag at multiple radio transceivers 220 of the gateway, the location of an EAS tag can be calculated e.g. using triangulation. The computer 310 in the gateway has or is connected to a screen 330 to display information to an operator of the system and a barcode scanner 320 for scanning barcodes on retail objects.

Figure 3:
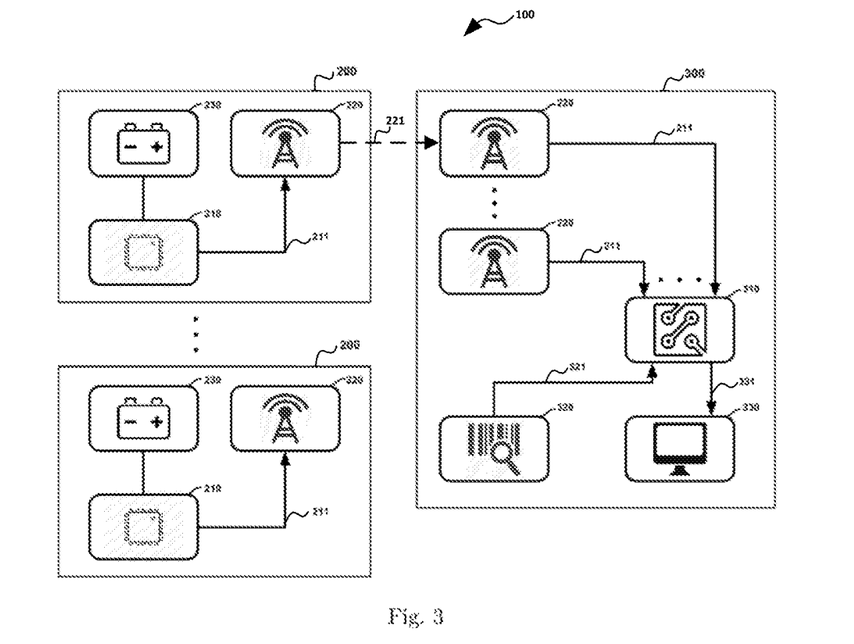
FIG. 3: Shows schematically an overview of a first implementation of EAS system.

FIG. 3 shows a first implementation of a system of a retail object monitoring system using a first implementation of an EAS tag. In operation there are multiple EAS tags 200 that broadcast data 221. The broadcast data 221 can be received by one or more radio transceivers 220 of the gateway 300. The broadcast data 221 comprises an identification number of the transmitting EAS tag. In the case where multiple radio transceivers 220 receives the broadcast data 221, each radio transceiver will pass the received data to the computer 310 together with information relating to the received signal like received signal strength etc. With the information about the received signal strength at different locations the location of an EAS tag can be calculated. Each of the EAS tags 200 will broadcast data 221 at intervals. The gateway 300 can then track the location over time of each individual EAS tag. The computer 310 has access to a database for storing data like the location of each EAS tag and other relevant data. In the case where there is no received broadcast from an EAS tag this can trigger an alert using the screen 330. In retail situation a barcode scanner 320 can be used to read barcodes of objects and link this barcode data to an identification number of an EAS tag.

Figure 4:
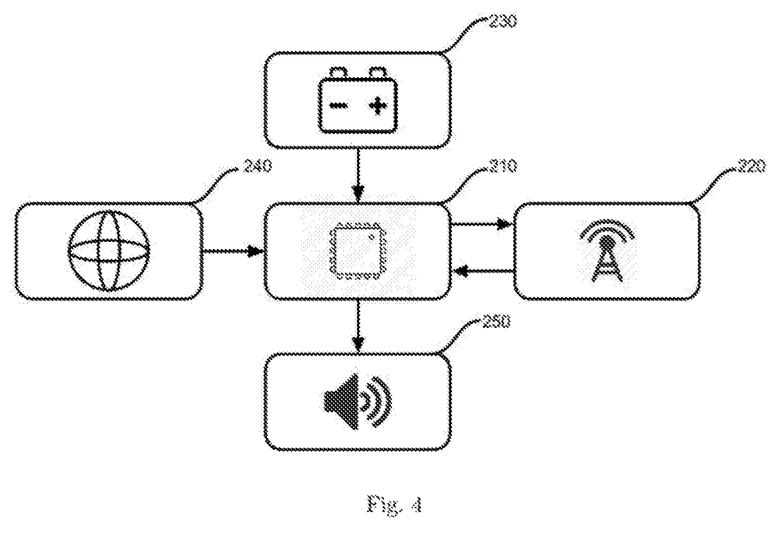
FIG. 4: Shows schematically an overview of a second implementation of an EAS tag.

In a second implementation of an EAS tag shown in FIG. 4, an EAS tag comprises a processor 210, a battery 230, a sound source 250, a movement detector 240 and a radio transceiver 220. The processor 210 is in this implementation a microcontroller, e.g. Atmega328pb-aures. The radio transceiver is an nrf24l01+ with a suitable antenna for wirelessly communicating with a receiver. The battery 230 is a suitable power source to power the EAS tag, e.g. cr2450. The sound source 250 can be any type of suitable loudspeaker, buzzer etc. The purpose of the sound source is to make a hearable sound to indicate theft, unwanted events or notification. The movement detector 240 in this second implementation is a 3-axis accelerometer. e.g. LIS3DH. The processor prepares the data and communicates this over a bus interface to the radio transceiver that converts this into wireless signals. Incoming wireless signals are received by the radio transceiver and communicated over a bus interface to the processor for decoding and further handling. In this second implementation of an EAS tag, the tag can wirelessly receive and transmit data.

Figure 5:
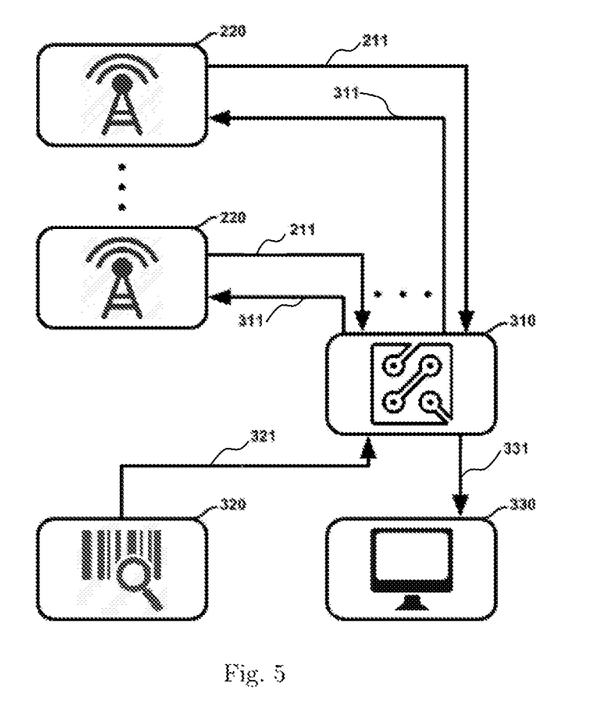
FIG. 5: Shows schematically an overview of a second implementation of a gateway.

In a system using this second implementation of an EAS tag there is a gateway that will monitor and receive the broadcasts from multiple EAS tags. Such a gateway is shown in FIG. 5. The gateway is a computer that communicates with multiple radio transceivers 220. The radio transceivers are adapted to receive the broadcast data from multiple EAS tags 200. The radio transceivers are placed at different locations in. e.g. a retail store. When knowing the location of the radio transceivers and the received signal strength of a broadcast from an EAS tag at multiple radio transceivers 220 the location of an EAS tag can be calculated with use of e.g. triangulation. The EAS tags and the gateway are configured such that they also can bi-directionally communicate data between them. After calculation of the location of an EAS tag this information can be used to select the closest radio transceiver to this EAS tag. The gateway 300 has or is connected to a screen 330 to show status and information to an operator and a barcode scanner 320 for scanning barcodes on retail objects.

Figure 6:
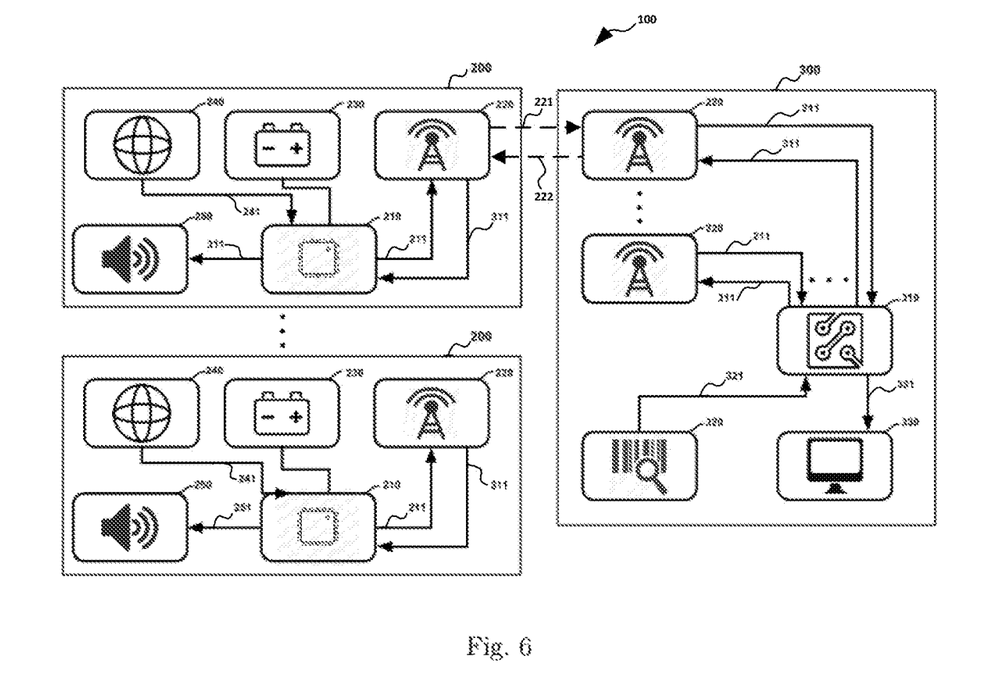
FIG. 6: Shows schematically an overview of a second implementation of an EAS system.

FIG. 6 shows a system overview of a second implementation of retail object monitoring system using the second implementation of an EAS tag. In operation there are one or more EAS tags 200 that broadcast data 221. The broadcast data 221 can be received by one or more radio transceivers 220 of the gateway 300. The broadcast data 221 contains an identification number of the transmitting EAS tag. In the case where multiple radio transceivers 220 receives the broadcast data 221, each radio receiver will communicate this to the computer 310 together with information relating to the received signal like received signal strength etc. With the information about the received signal strength from known different locations the location of an EAS tag can be calculated. Each of the EAS tags 200 will transmit data 221 at intervals. The gateway 300 can then track the location over time of each individual EAS tag. In this implementation the gateway 300 and the EAS tags can bi-directionally communicate with each other using a suitable wireless communication protocol. The gateway can trigger the sound source 250 by transmitting an alarm start command 222 to an EAS tag to make a sound indicating an event like e.g. theft. The EAS tags can be equipped with a movement detector 240. When no movement has been detected for a certain amount of time the EAS tag enters in to a low pulse rate transmit mode. The EAS tag will then transmit data at a low pulse rate. This avoids collisions of transmissions when multiple tags simultaneously transmit data. When there is movement detected the EAS tag enters in to a high pulse rate transmit mode. The EAS tag will stay in the high pulse rate transmit mode until a certain time delay after the movement stops and the EAS tag is informed by the gateway to return to low pulse rate transmit mode or that the EAS tag is deactivated. In low pulse rate transmit mode the EAS tag is transmitting its identification number typically with an interval of 2 minutes, while in high rate broadcast mode the EAS tag is transmitting its identification number preferably at a interval of 100 milliseconds. In high pulse rate transmit mode the gateway has high resolution information to track the location of an EAS tag. In the case where an EAS tag is not able to communicate with the gateway this can trigger an alarm. In cases where the EAS tag is determined to be outside a predetermined area this can also trigger an alarm.

The computer 310 has access to a database for storing information like the location of each EAS tag. In the case where there is no received broadcast from an EAS tag this can trigger an alert using the screen 330. In retail situation a barcode scanner 320 can be used to read barcodes of objects and link this barcode data to an identification number of an EAS tag.

Figure 7:
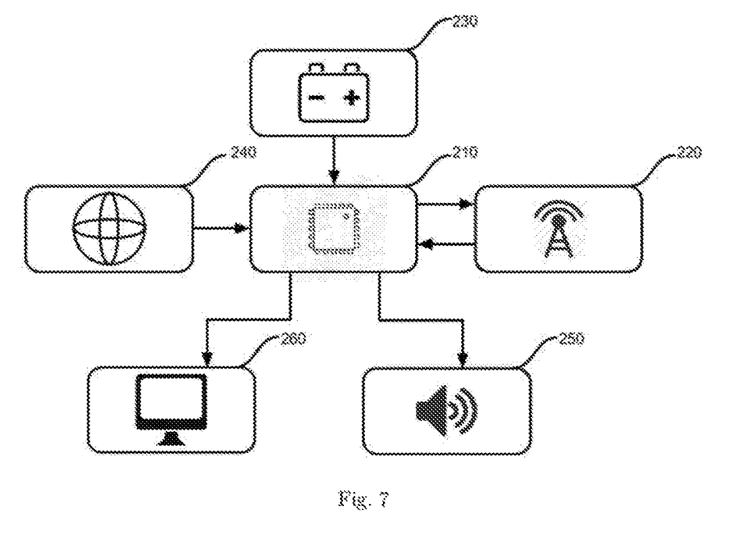
FIG. 7: Shows schematically an overview of a third implementation of an EAS tag.

In a third implementation of an EAS tag shown in FIG. 7, an EAS tag comprises of a processor 210, a battery 230, a sound source 250, a movement detector 240, a screen 260 and a radio transceiver 220. The processor 210 is in this implementation a microcontroller, e.g. Atmega328pb-aures. The radio transceiver is an nrf24l01+ with a suitable antenna for wirelessly communicating with a receiver. The battery 230 is a suitable power source to power an EAS tag, e.g. cr2450. The sound source 250 can be any type of suitable loudspeaker or buzzer. The purpose of the sound source is to make an audible sound to indicate theft or other unwanted events or for notification. The movement detector 240 in this third implementation is a 3-axis accelerometer e.g. LIS3DH. The screen 260 of this implementation can be a screen like an e-ink screen. The screen can display text or images like price or other relevant information, the control of what is displayed on the screen is managed by the processor. The processor prepares the data and communicates this over a bus interface to the radio transceiver that converts this into wireless signals. Incoming wireless signals are received by the radio transceiver and communicated over a bus interface to the processor for decoding and further handling. In this third implementation of an EAS tag, the EAS tag can wirelessly receive and transmit data.

Figure 8:
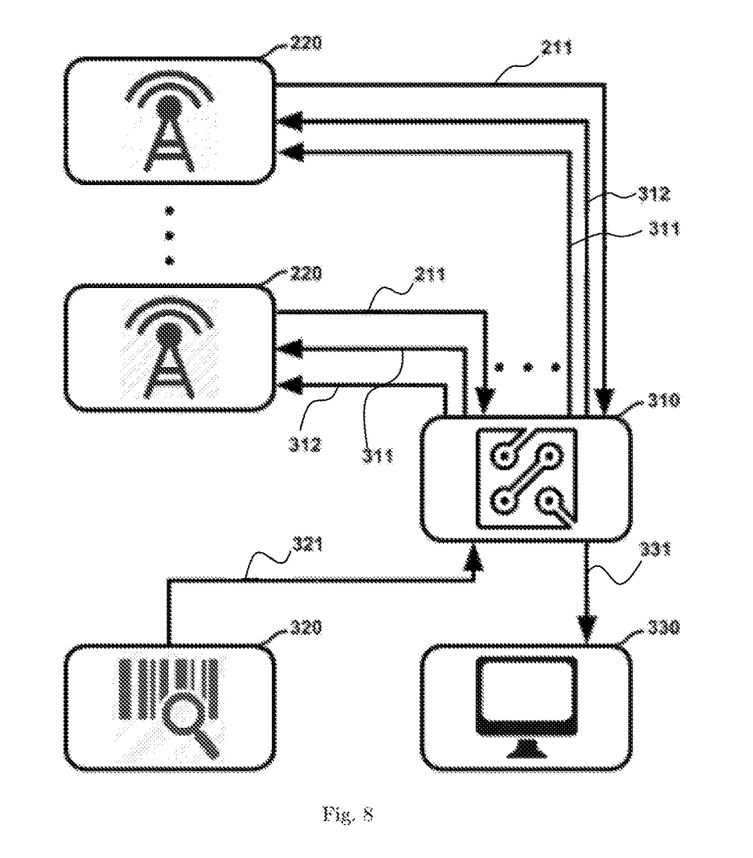
FIG. 8: Shows schematically an overview of a third implementation of a gateway.

In a system using this third implementation of an EAS tag there is a gateway that will monitor and receive the broadcasts from multiple EAS tags. Such a gateway is shown in FIG. 8. The gateway comprises a computer 310 that communicates with multiple radio transceivers 220. The radio transceivers are adapted to receive the broadcast data from multiple EAS tags 200. The radio transceivers are placed at different physical locations. e.g. in a retail store. With known location of the radio transceivers of the gateway and the received signal strength of a broadcast from an EAS tag by multiple radio transceivers 220 the location of an EAS tag can be calculated e.g. with triangulation. The EAS tags and the gateway are configured such that they also can bi-directionally communicate data between them. The gateway is connected through a bus interface to a screen 330 to display information to an operator of the system and a barcode scanner 320 for scanning barcodes on retail objects.

Figure 9:
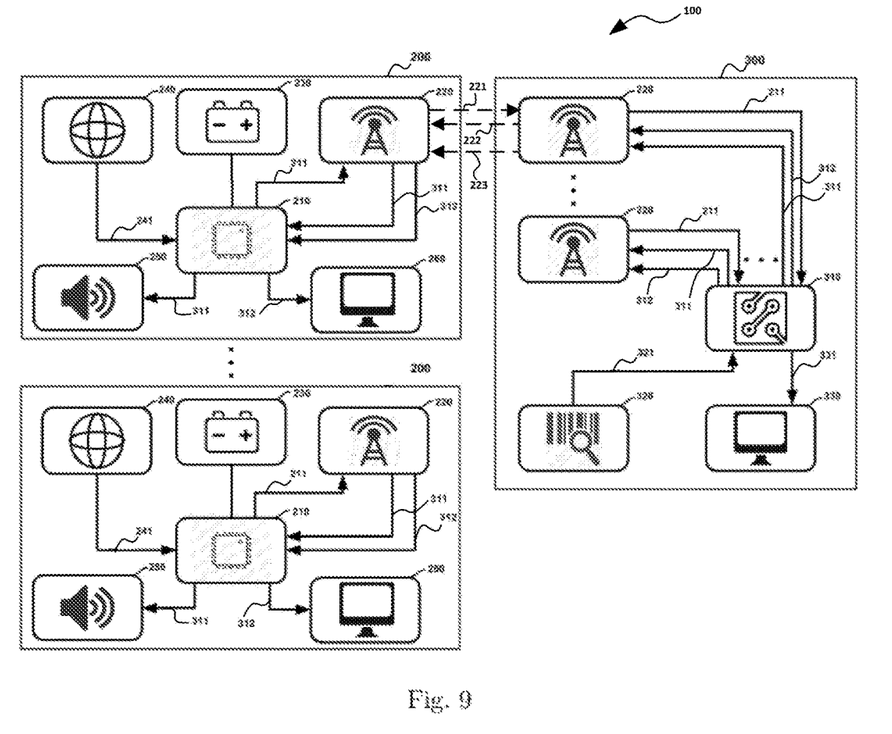
FIG. 9: Shows schematically an overview of a third implementation of EAS system.

FIG. 9 shows a system overview of a third implementation of retail object monitoring system using the third version of an EAS tag. In operation there are multiple EAS tags 200 that transmit data 221. The data 221 can be received by one or more radio transceivers 220 of the gateway 300. The broadcast data 221 comprises an identification number of the transmitting EAS tag. In the case where multiple radio transceivers 220 receives the broadcast data 221, each radio transceiver will pass these data to the computer 310 together with information relating to the received signal like received signal strength etc. With information related the received signal strength at known locations, the location of an EAS tag can be calculated. Each of the EAS tags 200 will transmit data 221 at intervals. The gateway 300 can then track the location over time of each individual EAS tag. In this implementation the gateway 300 and the EAS tags can in addition bi-directionally communicate with each other using a suitable wireless communication protocol. The gateway can trigger the sound source 250 by transmitting an alarm start command 222 to an EAS tag to make a sound indicating an event like e.g. theft. The gateway can further communicate information to the EAS tag that can be displayed on the screen 260, this can be information such as price, product name etc. All the EAS tags are equipped with a movement detector 240. When no movement has been detected for a certain amount of time the EAS tag enters in to a low pulse rate transmit mode. The EAS tag will then only transmit data at a low pulse rate. When movement is detected the EAS tag enters in to a high pulse rate transmit mode. The EAS tag will stay in the high pulse rate transmit mode until a certain time delay after the movement stops, the EAS tag is informed by the gateway to return to low rate broadcast mode or that the EAS tag is deactivated. In low pulse rate transmit mode the EAS tag is transmitting its identification number typically with an interval of 2 minutes, while in high pulse rate transmit mode the EAS tag is transmitting its identification number typically at an interval of 100 millisecond. In high pulse rate transmit mode the gateway would have high resolution data to track the location of the EAS tag. In the case where the EAS tag is not able to communicate with the gateway this can trigger an alarm. In another case where the EAS tag is determined by the gateway to be outside a predetermined area this can also trigger an alarm.

The computer 310 has access to a database for storing information like the location of each EAS tag and other relevant information. In the case where there is no received transmit from an EAS tag this can trigger an alert using the screen 330. In retail situation a barcode scanner 320 is connected to the computer and can be used to read barcodes of objects and link this barcode to an identification number of an EAS tag.

Figure 10:
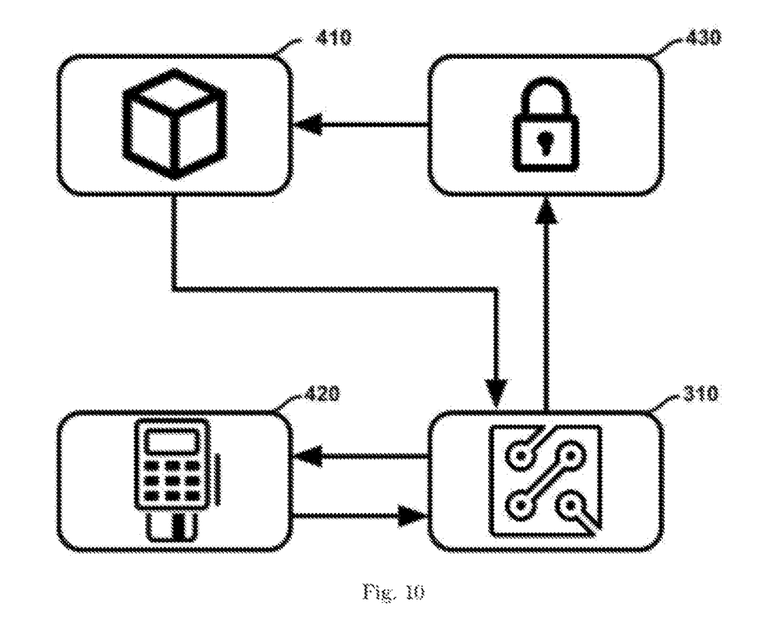
FIG. 10: Shows schematically an overview of an automatic payment system

FIG. 10 shows a system overview of implementation of a tag locking and unlocking system 400, where a retail object storage system 410, a locking system 430 for retail objects, a payment solution 420 and a computer 310 are connected together. When there is valid payment processed by the payment solution 420, the locking system 430 can unlock an EAS tag. The process of unlocking the EAS tag could comprise of marking the EAS tag as sold in the in an inventory database, disabling the EAS tag or in other way marking the EAS tag as sold.

Figure 11:
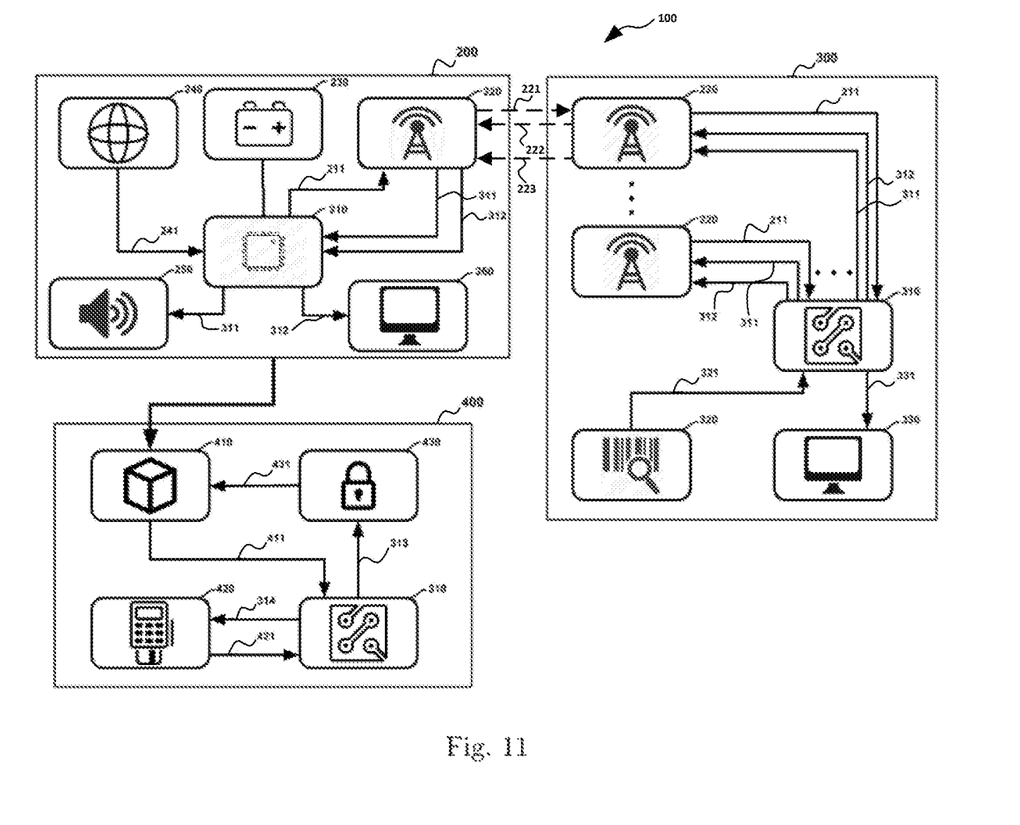
FIG. 11: Shows schematically an overview of a fourth implementation of an EAS system

FIG. 11 shows a system overview of a fourth system implementation of the retail object monitoring system, where the payment system and a third implementation of the retail object monitoring system is combined. A retail object monitoring system with the possibility to lock and unlock EAS tags comprises of a payment system 400, one or more EAS tags 200 and a gateway 300. An activated EAS tag 300 will upon detection of movement by the movement detector 240 change the rate of data broadcast from a low pulse rate to a high pulse rate. The gateway will then be able to track the movement of the EAS tag using multiple receivers 220 placed at different location in the monitored area. A customer can in this implementation with a valid payment using the payment system 420 make the payment system 420 inform the computer 310 in the tag locking and unlocking system 400 that a specific EAS tag should be unlocked. The process of unlocking the EAS tag could comprise of marking the EAS tag as sold in the in an inventory database, disabling the EAS tag or in other way marking the EAS tag as sold. The EAS tag is then unlocked using the unlock mechanism 430. One way that the EAS tag can be disabled is to instruct the EAS tag that it should return to transmitting at a low pulse rate. Then the EAS tag can be removed from the retail object and put aside for later use.

Figure 12:
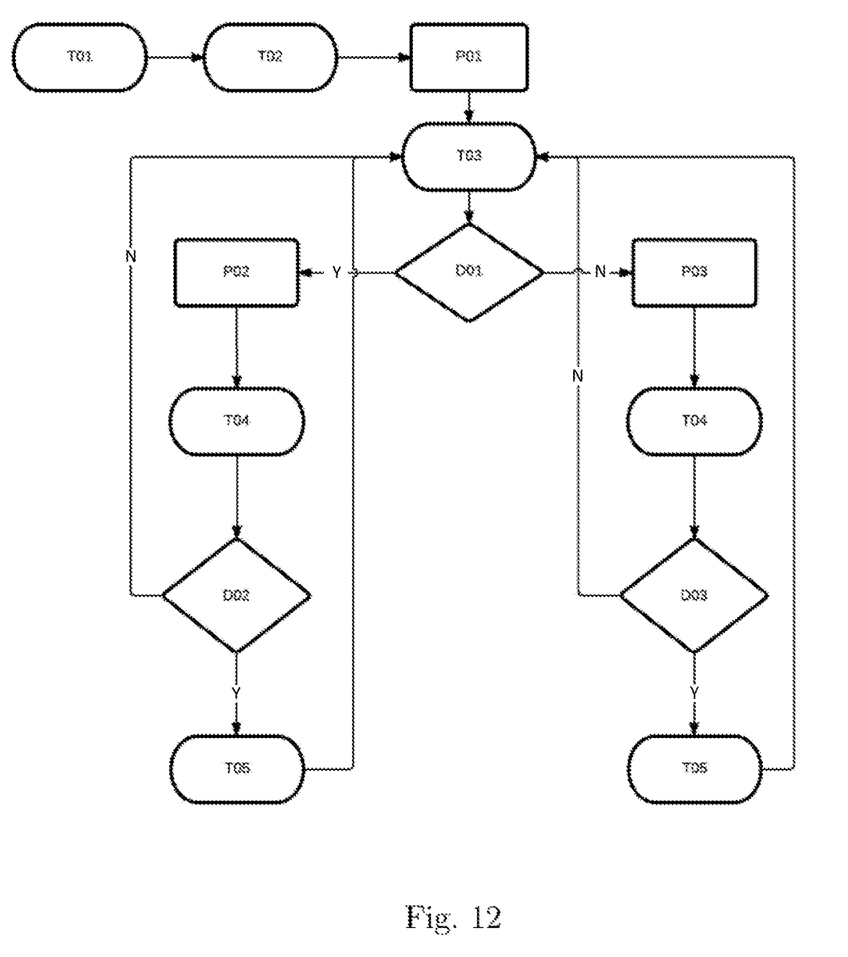
FIG. 12: Shows schematically an overview of a state machine of a method for altering the pulse rate of transmission

FIG. 12 shows a simplified view of a state machine for the EAS tag. The EAS tag is initialized T01 and configured T02 for use with an EAS system, the configuration and initialization comprises transmitting a signal P01 to a gateway. A normal procedure of operation is that the EAS tag is that it in a timely manner check the accelerometer T03 if there has been any movement since last it was checked. The procedure will then if there is detected movement D01 of the EAS tag perform a check T04 if there has been any movement within an interval of e.g. 100 ms also called active mode P02. As long as there is detected movement by the accelerometer the EAS tag will transmit its ID T05 at an interval of e.g. 100 ms. If at a point there is more than e.g. 100 ms since the last detected movement D02 by the accelerometer the EAS tag will enter into a sleep mode P03, where the accelerometer will be checked D03 at a longer interval e.g. 2 minutes. In this sleep mode (P03) the EAS tag will transmit its ID T05 at an interval of e.g. 2 minutes. The normal procedure will be to alternate between an active mode P02 and a sleep mode P03 where the alteration between the modes is triggered by detection of movement T03 by an accelerometer. In a need of deactivating an EAS tag due reasons like e.g. sale of an object the EAS tag can be forced to enter the sleep mode by instructions from a gateway or other means to instruct the EAS tag to change mode of operation.

For further description of FIG. 12 and the state machine of the EAS tag see the following table.

| Code | State |
| --- | --- |
| T01 | Start |
| T02 | Get RF channel |
| T03 | Check Accelerometer |
| T04 | Check elapsed time since last transmission |
| T05 | Transmit ID |
| P01 | Transmit Signal |
| P02 | Active mode |
| P03 | Sleep mode |
| D01 | Is the device moving? |
| D02 | Is the elapsed time greater than 100 ms? |
| D03 | Is the elapsed time greater than 2 minutes? |

The "Y" in FIG. 12 represents a positive result in the decisions D01, D02, D03 and the "N" in FIG. 12 represents a negative result in the decisions D01, D02, D03.

In an embodiment (not shown) of a retail object monitoring system a first, a second and a third implementations of EAS tags can be used together in a same system. A suitable system gateway can be used like a first, a second or a third implementation of a gateway. The first, second and third implementation of the EAS tag can coexist in the same system.

Preferably the above described embodiments of the systems the EAS tags transmit data at a desired pulse rate. In the case where the EAS tag can receive data from a gateway, this reception occurs typically infrequent. A transmission from an EAS tag is not usually expected to receive any acknowledgement or trigger any transmission of data from the gateway to the EAS tag. In the case of a sudden stop in transmissions of data from an EAS tag this would indicate an event like theft, failure, or similar.

The invention claimed is:
1. A system for monitoring retail objects, comprising:
at least one electronic device for monitoring of retail objects, the at least one electronic device comprising: at least one processing device, at least one communication device for wireless transmission wherein transmissions are transmitted at a pulse rate, at least one movement detector for detecting at least one event, wherein the pulse rate of transmission changes between different pulse rates of transmission depending on the at least one event;
at least one gateway for receiving transmissions from the at least one electronic device, wherein the transmissions from the at least one electronic device change between different pulse rates of transmission;
wherein the monitoring of retail objects comprises:
a) recording transmissions from at least one electronic device attached to a retail object by at least one gateway;
b) detecting a change in pulse rate of transmissions from at least one electronic device attached to a retail object by at least one gateway;

c) determining the localization of at least one electronic device attached to a retail object based on the received transmissions from at least one electronic device received by at least one gateway; and
d) generating notifications based on at least one of the detected changes in pulse rate of transmissions transmitted by at least one electronic device attached to a retail object and the determined changes in localization of at least one electronic device.

2. The system according to claim 1, wherein the movement detector detects Doppler shift.

3. The system according to claim 2, wherein the movement detector is an accelerometer.

4. The system according to claim 2, wherein the at least one event further comprises timeout of an earlier event.

5. The system according to claim 2, wherein the pulse rate of transmission changes between at least a first pulse rate of transmission and at least a second pulse rate of transmission, where the second pulse rate of transmission is higher than the first pulse rate of transmission.

6. The system according to claim 1, wherein the movement detector is an accelerometer.

7. The system according to claim 6, wherein the events further comprise timeout of an earlier event.

8. The system according to claim 6, wherein the pulse rate of transmission changes between at least a first pulse rate of transmission and at least a second pulse rate of transmission, where the second pulse rate of transmission is higher than the first pulse rate of transmission.

9. The system according to claim 1, wherein the at least one event further comprises timeout of an earlier event.

10. The system according to claim 9, wherein the pulse rate of transmission changes between at least a first pulse rate of transmission and at least a second pulse rate of transmission, where the second pulse rate of transmission is higher than the first pulse rate of transmission.

11. The system according to claim 1, wherein the pulse rate of transmission changes between at least a first pulse rate of transmission and at least a second pulse rate of transmission, where the second pulse rate of transmission is higher than the first pulse rate of transmission.

12. The system according to claim 1, wherein the electronic device is a tag.

13. The system according to claim 12, wherein the tag, is an EAS tag.

14. The system according to claim 1, further comprising a screen for displaying graphical information, wherein the screen is operatively connected to the movement detector, and wherein the screen is activated when events are detected by the movement detector.

15. The system according to claim 1, further comprising a method for altering the pulse rate of transmission of the at least one electronic device, wherein when detecting an event the pulse rate changes between different pulse rates.

16. The system according to claim 15, wherein the detected event comprises movement of the at least one electronic device.

17. The system according to claim 15, wherein the event further comprises a timeout from an earlier event.

18. The system according to claim 15, wherein a second pulse rate of transmission is higher than a first pulse rate of transmission.

19. The system according to claim 15, wherein there is a time delay to change from a first pulse rate to a second pulse rate of transmission.

20. A method for monitoring retail objects, the method comprising:
a) recording transmissions from at least one electronic device attached to a retail object by at least one gateway;
b) detecting a change in pulse rate of transmissions from at least one electronic device attached to a retail object by at least one gateway;
c) determining the localization of at least one electronic device attached to a retail object based on the received transmissions from at least one electronic device received by at least one gateway;
d) generating notifications based on at least one of the detected changes in pulse rate of transmissions transmitted by at least one electronic device attached to a retail object and the determined changes in localization of at least one electronic device; and
e) altering a pulse rate of transmission of at least one electronic device;
wherein the at least one electronic device comprises:
at least one processing device;
at least one communication device for wireless transmission wherein transmissions are transmitted at a pulse rate;
at least one movement detector for detecting at least one event, wherein the pulse rate of transmission changes between different pulse rates of transmission depending on the at least one event;
wherein the at least one gateway is configured for receiving transmissions from the at least one electronic device, wherein the transmissions from the at least one electronic device change between different pulse rates of transmission.

* * * * *